Feb. 13, 1945.     N. H. WILLIAMS     2,369,628
WATER GAS AND PRODUCER GAS GENERATOR
Filed Jan. 18, 1943
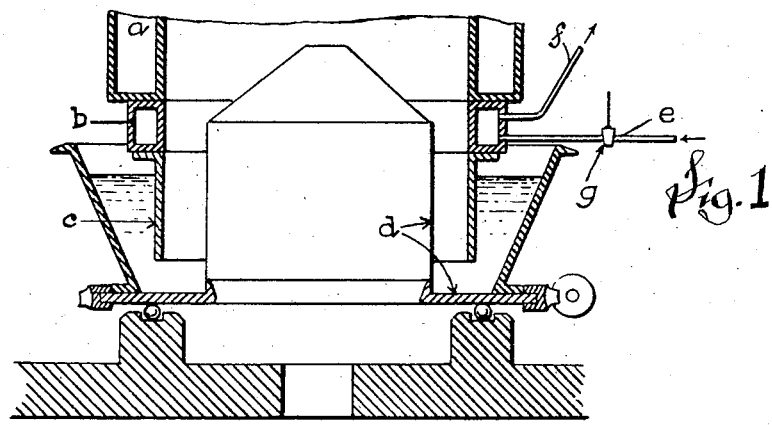
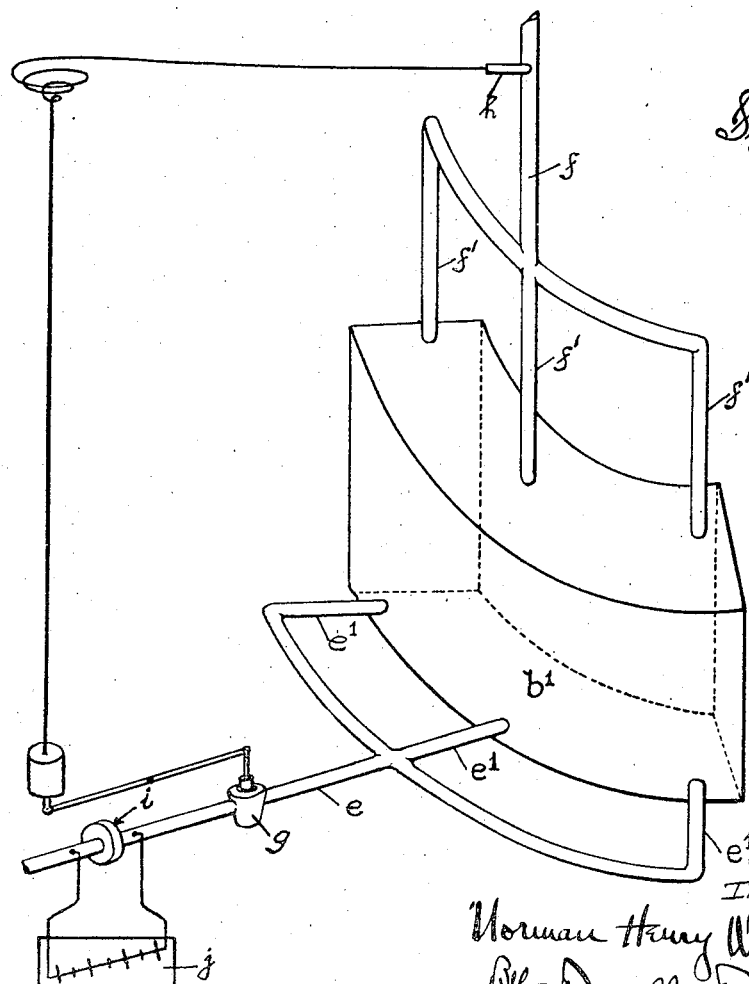
INVENTOR:—
Norman Henry Williams
By Dowell & Dowell
ATTORNEYS Patented Feb. 13, 1945

2,369,628

UNITED STATES PATENT OFFICE 2,369,628

WATER GAS AND PRODUCER GAS GENERATOR

Norman Henry Williams, Westminster, England, assignor to Humphreys & Glasgow Limited, Westminster, London, England Application January 18, 1943, Serial No. 472,766
In Great Britain February 27, 1942

2 Claims. (Cl. 48—67)

This invention has reference to water gas or producer gas generators in which part of the wall of the generator is constructed with a metal jacket which is relatively shallow and is cooled by water on the side away from the fire.

If part of the fireside face of the water jacket is cooled too far by too liberal a flow of water there is danger that steam will condense on this face and cause corrosion, especially as acidic or corrosive constituents may be dissolved from the gases by the condensed steam and the solutions so formed become concentrated by subsequent re-evaporation of the water due to the local temperature inside the generator subsequently being raised.

The object of the present invention is to reduce this risk and for this purpose there is provided a thermostat control device which is actuated by the temperature of the hot water leaving the water jacket and is arranged to control the flow of the cooler water to the jacket so that the quantity of water passing through the jacket is automatically suited to the temperature condition inside the generator adjacent to the jacket.

The water jacket may be subdivided into several sections and each section may have several inlet and outlet connections for water, a plurality of thermostats being provided to control the water flow to different sections.

The evolution of steam within the jacket may not be desired in which case the thermostat control should be set to operate some degrees below boiling point, but is is preferably set so that the water leaving the jacket is as close as practicable to boiling point. In order to give more latitude and permit the thermostat to be set to operate at a temperature further below the boiling point of water with a consequent lesser risk of steam generation, the temperature fall from the fireside of the metal wall to the cooling water may be increased by coating the water side of the metal wall with material of low heat conductivity so that, although the cooling water is definitely below its boiling point, yet the temperature at the fireside face is very little below or even above 212° F. The material may be applied as a thin film as by painting it on the inner surface of the jacket wall.

To reduce deposition of scale on the walls of the water jacket with consequent variation in the rapidity with which heat is conducted to the water, it is preferable to use softened water, such as water suitable for boiler feed purposes, and such water may, if desired, be utilised as preheated boiler feed water.

If desired, orifice meters or other indicating or measuring means may be inserted in the path of the inflowing cool water to the jacket or its several sections so that the rate of water inflow, which is controlled thermostatically, is used as a measure of the rate of heat transfer from the fireside wall of the water jacket and hence provides an indication of the condition and/or position of the fire inside the generator.

In a self-clinkering generator with an annular boiler forming part of the wall of the generator, a thermostatically controlled water jacket as hereinbefore described may be provided below the boiler forming a water cooled metal ring against which clinker is crushed by the action of the mechanically operated grate. With such an arrangement the water inflow to the jacket, or to each of its sections, may be measured, the measurements serving as a guide to the control of the operation of the grate.

In the accompanying drawing the invention is illustrated diagrammatically and by way of example in connection with such a self-clinkering generator.

Fig. 1 representing in vertical section the lower part of the generator; and

Fig. 2 a schematic representation of one section of the water jacket and its thermostatic control arrangements.

Referring to Fig. 1 $a$ is the annular boiler forming part of the wall of the generator, $b$ the water jacket and $c$ a ring or annular apron dipping into a water seal in the grate structure $d$ which is rotated by worm gear. $e$ is a cold water inlet pipe to the water jacket $b$ and $f$ a hot water outlet pipe therefrom. $g$ is a valve in the pipe $e$ which valve is controlled by a thermostat (not shown in Fig. 1) in the hot water outlet pipe $f$; the valve $g$ which controls the flow of water through the jacket might equally well be in the outlet pipe $f$.

As already stated the water jacket may be subdivided into sections. Fig. 2 shows one such section $b^1$ having three inlet connections $e^1$ extending from a common cold water supply pipe $e$ and three outlet connections $f^1$ connected to a common outlet pipe $f$ into which extends a thermostat $h$ that is coupled up to the valve $g$. $i$ represents an orifice meter in the pipe $e$ and $j$ a differential gauge in connection therewith.

What I claim is:

1. A gas generator having a water-cooled metal jacket, a cool water inlet pipe to said jacket and a heated water outlet pipe from said jacket, a thermostat actuated by the temperature of the hot water flowing through the outlet pipe, a valve controlling the flow of water through said pipes and jacket, and a connection between the thermostat and the valve, whereby the quantity of water passing through the jacket is automatically suited to the temperature condition inside the generator adjacent to the jacket said thermostat maintaining the valve open when the water temperature adjacent thereto exceeds a predetermined amount; the inlet pipe being provided with orifice metering means.

2. A self-clinkering generator with an annular boiler forming part of the wall of the generator, a water jacket below the boiler, a mechanically operated grate extending to the level of the jacket which forms a water cooled metal ring against which clinker is crushed by the action of the mechanically operated grate, a cool water inlet to and a heated water outlet from said jacket, a thermostat in the outlet, a valve in the inlet and an operative connection between the thermostat and the valve whereby the valve is opened as the thermostat expands said thermostat maintaining the valve open when the water temperature adjacent thereto exceeds a predetermined amount; the inlet pipe being provided with orifice metering means.

NORMAN HENRY WILLIAMS.